US009136038B2

(12) United States Patent
Lin et al.

(10) Patent No.: US 9,136,038 B2
(45) Date of Patent: *Sep. 15, 2015

(54) MOISTURE-PROOF AND INSULATING COATING MATERIAL AND USES THEREOF

(75) Inventors: Bo-Hsuan Lin, Tainan (TW); Kuang-Chieh Li, Tainan (TW)

(73) Assignee: CHI MEI CORPORATION, Tainan (TW)

( * ) Notice: Subject to any disclaimer, the term of this patent is extended or adjusted under 35 U.S.C. 154(b) by 531 days.

This patent is subject to a terminal disclaimer.

(21) Appl. No.: 13/443,129

(22) Filed: Apr. 10, 2012

(65) Prior Publication Data

US 2012/0277363 A1 Nov. 1, 2012

(30) Foreign Application Priority Data

Apr. 26, 2011 (TW) .............................. 100114369 A

(51) Int. Cl.
C09D 153/00 (2006.01)
C09D 193/04 (2006.01)
H01B 3/44 (2006.01)

(52) U.S. Cl.
CPC ............ *H01B 3/442* (2013.01); *C09D 153/005* (2013.01); *C09D 193/04* (2013.01); *H01B 3/441* (2013.01)

(58) Field of Classification Search
CPC .. C09D 193/04; C09D 153/005; H01B 3/442; H01B 3/441
USPC .......................................... 524/270, 274, 505
See application file for complete search history.

(56) References Cited

U.S. PATENT DOCUMENTS

2010/0168298 A1* 7/2010 Kao et al. ....................... 524/147
2013/0059963 A1* 3/2013 Li et al. ........................... 524/502

FOREIGN PATENT DOCUMENTS

| CN | 1643102 A | 7/2005 |
|---|---|---|
| JP | 2000-510512 | 8/2000 |
| JP | 2001-040031 | 2/2001 |
| JP | 2005-126456 | 5/2005 |
| JP | 2005-126456 A | 5/2005 |
| JP | 2005-162986 | 6/2005 |
| JP | 2006-335975 | 12/2006 |
| JP | 2007084805 A * | 4/2007 |
| JP | 2008-189793 A | 8/2008 |
| JP | 2010-155966 | 7/2010 |
| TW | 201024328 A | 7/2010 |
| WO | 03/066770 | 8/2003 |

OTHER PUBLICATIONS

English machine translation of JP 2005-126456, May 2005.*
Office action issued on Dec. 24 for the corresponding Taiwan, R.O.C. Patent Application No. 100114369, 2014.
English abstract translation for TW 201024328 A, Jul. 1, 2010.
Office action issued on Dec. 11, 2013 to the corresponding Chinese Patent Application No. 201210108895.1.
WO2003/066770 corresponds to CN1643102A, Aug. 14, 2003.
Office Action and Search Report issued on Sep. 2, 2013 of the corresponding Taiwan Patent Application No. 100114369.
Office Action issued on Sep. 18, 2013 of the corresponding Japanese Patent Application No. 2012-090837.
English translation of the Office Action issued on Sep. 18, 2013 of the corresponding Japanese Patent Application No. 2012-090837.
English abstract translation of JP 2010-155966, Jul. 15, 2010.
English abstract translation of JP 2005-126456A, May 19, 2005.
English abstract translation of JP 2008-189763A, Aug. 21, 2008.
English abstract translation of JP JP2006-335975, Dec. 14, 2006.
English abstract translation of JP 2005-126456, May 19, 2005.
English abstract translation of JP 2005-162986, Jun. 23, 2005.
JP2000-510512 corresponds to U.S. Pat. No. 5,728,777, U.S. Pat. No. 5,959,035, U.S. Pat. No. 5,646,225. Abstract of U.S. Pat. No. 572,877 provided for English abstract translation, Jul. 8, 1997.
English abstract translation of JP 2001-040031, Feb. 13, 2001.

* cited by examiner

*Primary Examiner* — Angela C Scott
(74) *Attorney, Agent, or Firm* — WPAT, P.C.; Anthony King

(57) ABSTRACT

The invention relates to a moisture-proof and insulating coating material comprising a block copolymer or hydrogenated copolymer thereof (A), an adhesive resin (B) and a solvent (C). The block copolymer or hydride (A) comprises at least two vinyl aromatic polymer blocks and at least one conjugated diene polymer block, and in the moisture-proof and insulating coating material, the content of residual vinyl aromatic monomer is less than 300 ppm, and the content of vinyl aromatic oligomer is less than 300 ppm. The moisture-proof and insulating coating material according to the invention has good reworkability. A moisture-proof and insulating film and a method for producing the same and an electrical component comprising the moisture-proof and insulating film and a method for producing the same are also provided in the invention.

12 Claims, No Drawings

MOISTURE-PROOF AND INSULATING COATING MATERIAL AND USES THEREOF

BACKGROUND OF THE INVENTION

1. Field of the invention

The invention relates to a moisture-proof and insulating coating material for an electronic part and an electronic part which is moisture-proof and insulation treated with the moisture-proof and insulating coating material and a method for producing the same. Particularly, the invention provides a moisture-proof and insulating coating material for an electronic part having good reworkability.

2. Description of the Related Art

Technological advancements in electronics has been accompanied by a steady increase in miniaturization and multiple functionality of parts. Insulating coatings are commonly applied to such electronic parts for protection from moisture, dust, gas and provide insulation.

A conventional coating material for a covering coating is disclosed in Japanese Patent Publication No. 2005-132966. The coating material contains a methacrylate resin, a polyolefin resin or polyurethane resin and butyl acetate solvent. However, a coating film produced with the aforementioned conventional insulating coating material tends to have a poor reworkability, and the electronic parts are easily damaged when removing the coating film.

To resolve this shortcoming, Japanese Patent Publication No. 2008-189763 discloses the use of a block copolymer in the coating materials. To improve reworkability, the content of the vinyl aromatic polymer block in the block copolymer is controlled to 20 to 60 mole % of the copolymer. Unfortunately, the improvement in reworkability is limited; moreover, removal of the coating film is relatively slow, and the coating film is prone to fracture and residue formation.

The need for rapid removal of coating film without fracture and residue formation during reworking has become a key topic in the field of manufacturing sophisticated electronic products.

SUMMARY OF THE INVENTION

In the present invention, the contents of an residual vinyl aromatic monomer and a vinyl aromatic oligomer in a moisture-proof and insulating coating material are controlled to obtain a moisture-proof and insulating coating material having good reworkability.

Therefore, the invention relates to a moisture-proof and insulating coating material comprising:
- a block copolymer or hydrogenated copolymer thereof (A) comprising at least two vinyl aromatic polymer blocks and at least one conjugated diene polymer block;
- an adhesive resin (B) and
- a solvent (C);
- wherein the content of an residual vinyl aromatic monomer in the moisture-proof and insulating coating material is less than 300 ppm, and the content of a vinyl aromatic oligomer is less than 300 ppm.

The present invention also provides a method for producing the moisture-proof and insulating coating material, comprising coating an electronic part with the moisture-proof and insulating coating material mentioned above.

The present invention also provides a moisture-proof and insulating film, which is produced according to the method mentioned above.

The present invention further provides an electronic part, comprising the moisture-proof and insulating film mentioned above.

The present invention still further provides a method for producing an electronic part, comprising providing a moisture-proof and insulating film according to the method mentioned above.

DETAILED DESCRIPTION OF THE INVENTION

The invention relates to a moisture-proof and insulating coating material comprising:
- a block copolymer or hydrogenated copolymer thereof (A) comprising at least two vinyl aromatic polymer blocks and at least one conjugated diene polymer block;
- an adhesive resin (B) and
- a solvent (C);
- wherein the content of an residual vinyl aromatic monomer in the moisture-proof and insulating coating material is less than 300 ppm, and the content of a vinyl aromatic oligomer is less than 300 ppm.

The block copolymer or hydrogenated copolymer thereof (A) according to the invention is preferably a vinyl aromatic polymer block-conjugated diene block-vinyl aromatic polymer block type. Examples of the vinyl aromatic monomer are styrene, a-methyl styrene, p- methyl styrene, divinylbenzene, 1,1-diphenylethylene, N,N-dimethyl-p- amino ethyl styrene and N,N-diethyl-p-amino ethyl styrene. More than one of the vinyl aromatic monomer is used; alternatively, more than two of the vinyl aromatic monomer can be used. In another aspect, the conjugated diene monomer is a diene comprising a pair of conjugated double bonds. Examples are 1,3-butadiene, 2-methyl-1,3-butadiene (isoprene), 2,3-dimethyl-1,3-butadiene, 1,3-pentadiene, 2-methyl-1,3-pentadiene and 1,3-hexadiene, and preferably are 1,3-butadiene and isoprene. More than one of the conjugated diene monomer is used; alternatively more than two of the conjugated diene monomer can be used.

In one preferred embodiment of the invention, the block copolymer is styrene-butadiene-styrene block copolymer (SBS), styrene-isoprene-styrene block copolymer (SIS), styrene-vinylisoprene-styrene block copolymer (SVIS), styrene-ethylene/butylene-styrene block copolymer (SEBS), styrene-ethylene/propylene-styrene block copolymer (SEPS), or styrene-butadiene-butylene-styrene block copolymer (SBBS).

The content of the vinyl aromatic polymer block according to the invention in the block copolymer or hydrogenated copolymer thereof (A) can be decided by artisans skilled in this field, and preferably is 20 mol % to 60 mol %. When the content of the vinyl aromatic polymer block in the block copolymer or hydrogenated copolymer thereof (A) is 20 mol % to 60 mol %, the moisture-proof and insulating coating material has better adhesion when applied to electronic parts such as glass, semiconductors or printed circuit boards.

The contents of the residual vinyl aromatic monomer and the vinyl aromatic oligomer in the moisture-proof and insulating coating material according to the invention is adjusted to obtain a moisture-proof and insulating coating material having good reworkability.

In the moisture-proof and insulating coating material according to the invention, the content of an residual vinyl aromatic monomer is less than 300 ppm; preferably 10 ppm to 275 ppm; more preferably 10 ppm to 250 ppm.

In the moisture-proof and insulating coating material according to the invention, the content of the vinyl aromatic oligomer is less than 300 ppm; preferably 100 ppm to 300 ppm. The vinyl aromatic oligomer as used herein preferably refers to a vinyl aromatic oligomer having molecular weight of 140 to 400. In particularly, the vinyl aromatic oligomer comprises the dimer of the vinyl aromatic monomer and the trimer of the vinyl aromatic monomer. Examples of the dimer of the vinyl aromatic monomer are 2,4-diphenyl-1-butene, cis-1,2-diphenylcyclobutane, and trans-1,2-diphenylcyclobutane. Examples of the trimer of the vinyl aromatic oligomer are 2,4,6-triphenyl-1-hexene, 1-phenyl-4-(1'-phenylethyl)naphthalene (four kinds of isomers are included), and 1,3,5-triphenyl-cyclohexane.

The proper method for producing the block copolymer or hydrogenated copolymer thereof (A) can be decided by artisans skilled in this field according to the contents of the residual vinyl aromatic monomer and vinyl aromatic oligomer.

In one preferred embodiment of the invention, the contents of the residual vinyl aromatic monomer and vinyl aromatic oligomer are controlled through a proper synthesis. For example, an anionic polymerization method which uses the organic lithium initiator is applied. In one embodiment of the invention, a reaction system is provided. The reaction system comprises a Continuous stirred-tank reactor R1 which is preferably coupled to a agitator means to have a reflux flow. A raw material system can be fed continuously or batch-wise from one side of the reactor R1, and the product extracted from one side of the reactor R1 in the continuous polymerization. Preferably, a plurality of the reactors R1 or one reactor R1 and a plug flow reactor R2 are combined to carry out a complex polymerization. More preferably, the Continuous stirred-tank reactor R1 is connected to the plug flow reactor R2. The reflux flow makes the initiator have a larger residence time distribution and significantly improve the molecular weight distribution of the polymer. More preferably, the reaction system further comprises a Continuous stirred-tank reactor R3 coordinated with the plug flow reactor R2, which enables the monomers to be mixed completely and converted to the polymer more efficiently, thus improving molecular weight distribution. This method is helpful in converting the monomer to the polymer completely and reduces the contents of the residual vinyl aromatic monomer and vinyl aromatic oligomer in the moisture-proof and insulating coating material and enhances the low molecular weight ingredient to volatize after the desiccation of the resins.

In another aspect, the contents of the residual vinyl aromatic monomer and vinyl aromatic oligomer are reduced by controlling the feed rate. The polymerization rate of the monomer and the feed rate of the monomer are balanced to reduce the residual monomer content in the Continuous stirred-tank reactor. Because the producing rate of the oilgomer such as the dimer or the trimer of the vinyl aromatic monomer is proportional to the content of the monomer, the content of the oligomer is significantly reduced by reducing the content of the monomer through controlling the feed rate.

In another aspect, the contents of the residual vinyl aromatic monomer and vinyl aromatic oligomer are reduced by controlling the content of the organic lithium initiator. The organic lithium according to the invention refers to an organic metallic compound having a carbon-lithium binding; preferably an alkyl or a phenyl and substitutes of lithium thereof. Ethyl lithium, n-propyl lithium, n-butyl lithium, sec-butyl lithium, tert-butyl lithium, and benzyl lithium are mentioned as a desirable example of the alkyl lithium. Preferably, the amount of the organic lithium used is 0.5 mmol to 200 mmol; more preferably 1 mmol to 100 mmol; still more preferably 2 mmol to 20 mmol per 1 kg of the monomer.

In one preferred embodiment of the invention, the vinyl aromatic monomer is contained in a solvent to enhance the reaction of the organic lithium initiator. Preferably, the solvent is a hydrocarbon solvent which can dissolve a monomer and a formed polymer, and maintain the liquid form in the process of polymerization, and can be easily removed by volatilization after the polymerization. For example, the solvent can be an alicyclic hydrocarbon solvent of C5-C9 or an aromatic solvent of C6-C9. The examples of the alicyclic hydrocarbon solvent of C5-C9 are cyclohexane, methylcyclohexane, methylcyclopentane, cyclohexenes, and the mixture thereof. The examples of the aromatic solvent of C6-C9 are benzene, toluene, ethylbenzene, xylene, naphthalene, and the mixture thereof. The ratio of the solvent and the monomer is preferably 0.1 to 3 kg of the solvent; more preferably 0.5 to 2.0 kg; still more preferably 0.67 to 1.5 kg per kg of the monomer.

In still another aspect, the contents of the residual vinyl aromatic monomer and vinyl aromatic oligomer relate to the temperature of the polymerization. If the temperature of the polymerization is too low, the reaction rate is reduced and the production efficiency is poor. On the other hand, if the temperature of the polymerization is too high, residual vinyl aromatic monomer and vinyl aromatic oligomer content increases, and the reaction rate is reduced with the decrease of the initiator. Preferably, the temperature of the polymerization is 40 to 120° C.; more preferably, 60 to 110° C.; still more preferably, 70 to 90° C.

The block copolymer or hydrogenated copolymer thereof (A) according to the invention can be produced by a publicly known method. For example, a batch wise or continuous polymerization in the hydrocarbon solvent and the organic lithium initiator is carried out to obtain the block copolymer comprising the vinyl aromatic polymer block and the conjugated diene polymer block. After copolymerization, the copolymer comprising the vinyl aromatic polymer block and the conjugated diene polymer block can be further produced by coupling the lithium activity end of the copolymer. The concrete manufacturing method is described in Japanese Patent Nos. 1970-19388 and 1972-43618. Such documents are incorporated as references.

In one preferred embodiment of the invention, the polymerization is carried out in a solvent. The kinds and the amount of the solvent of the polymerization can be those of the monomer as mentioned above.

In one preferred embodiment of the invention, the temperature of the polymerization can be that of the vinyl aromatic monomer.

In one another preferred embodiment of the invention, the contents of the residual vinyl aromatic monomer and vinyl aromatic oligomer are reduced by purifying the block copolymer or hydrogenated copolymer thereof (A). For example, several repetitions of the volatilization removal of the block copolymer or hydrogenated copolymer thereof (A) is preferred. Particularly, the unreacted monomer and/or oligomer or solvent are volatilized and removed and recycled. A publicly known method can be used for the volatilization removal, such as a volatilization removal equipment. In one preferred embodiment of the invention, the volatilization removal is conducted by a flash treatment in a vacuum tank and by removal through a vent-port of an extrusion machine. In one preferred embodiment of the invention, the volatilization removal of the solvent or the residual vinyl aromatic monomer and vinyl aromatic oligomer is conducted at the temperature of 150° C. to 300° C.; preferably 180° C. to 260; and at the pressure of 0 to the normal pressure; preferably 100 Pa to 50 KPa. In one preferred embodiment of the invention, a plurality of volatilization removal equipment in parallel or in series is applied in order to remove the residual vinyl aromatic monomer and vinyl aromatic oligomer more effectively. More preferably, water is added between the first step and the second step of volatilization removal to enhance the effectiveness of the second volatilization.

In another aspect, in one preferred embodiment of the invention, when the number average molecular weight of the block copolymer or hydrogenated copolymer thereof (A) is from 50,000 to 100,000, the moisture-proof and insulating coating material with good reworkability is obtained.

The moisture-proof and insulating coating material according to the invention comprises the adhesive resin (B) to provide better adhesion when applied to electronic parts such as glass, semiconductors or printed circuit boards.

In one preferred embodiment of the invention, the adhesive resin (B) comprises petroleum resin, rosin resin or terpene resin. Such materials easily dissolve in the solvent.

The petroleum resin is preferably an aliphatic petroleum resin, aromatic petroleum resin, alicyclic petroleum resin, aliphatic/aromatic copolymerization petroleum resin, and the hydrogenation petroleum resin thereof.

The petroleum resin according to the invention can be commercially available products, such as: "ARKON P" and "ARKON M" (both trade names) produced by Arakawa Chemical Industries Corporate; "escorez" and "tohopetorosin" (both trade names) produced by Tonen Sekiyu Kagaku K.K; "Hi-rez," "takace" and "FTR" (all trade names) produced by Mitsui Chemicals Inc.; "Quintone" (trade name) produced by Japan's ZEON Corporation; "wingtak" (trade name) produced by Goodyear; "startak" (trade name) produced by Dainippon Ink and Chemicals.

The rosin resin preferably is a rosin and its derivative, and a rosin modified resin. The origin can be a natural rosin or a synthesized rosin. In one preferred embodiment of the invention, the rosin resin is a pentaerythritolester rosin, a glycerine ester rosin or the hydrogen additive thereof. A commercial product can be also applied, such as: "ester gum," "wood rosin," "ester gum A," "ester gum H," "PENSEL A," and "PENSEL C" (all trade names) produced by Arakawa Chemical Industries Corporate; "pentalin A," "fooraru AX," "fooraru 85," "fooraru 105" and "pentalin C" (all trade names) produced by Rika Hercules Inc.

The terpene resin is preferably a polyterpene, a terpene phenol resin, or the hydrogenation thereof. A commercial product can be also applied, such as: "picolight S" and "picolight A" (both trade names) produced by Rika Hercules Inc.; and "YS resin," "YS Polyster-T" and "Clearon" (all trade names) produced by YASUHARA CHEMICAL Inc.

In one preferred embodiment of the invention, a commercial adhesion resin (B) is applied, such as: KE311, KE604, P100, P125, P140, M100, M115, M135, A100, S100, 101 and 102 (produced by Arakawa Chemical Industries Corporate), YSTO125, TR105, CREARON P125, CREARON M115, CREARON K110, CREARON K4090, RESIN U130, RESIN T145, RESIN T160, and YST0125 (produced by Yasuhara Chemical).

The softening point of the adhesion resin (B) is not limited, and preferably is 100° C. to 150° C.; more preferably is 110° C. to 140° C. measured with the ring and ball method. When the softening point of the adhesion resin (B) is 100° C. to 150° C., the moisture-proof and insulating coating material according to the invention has a better adhesion when applied to the electronic parts such as glass, semiconductors or printed circuit boards.

According to the invention, the amount of the adhesive resin (B) used is preferably 20 to 60 parts by weight; more preferably 22 to 58 parts by weight; still more preferably 25 to 55 parts by weight based on the amount of 100 parts by weight used of the block copolymer or hydrogenated copolymer thereof (A). When the amount of the adhesive resin (B) used is 20 to 60 parts by weight, the moisture-proof and insulating coating material according to the invention has a better adhesion and moisture-proof functionality when applied to electronic parts such as glass, semiconductors or printed circuit boards.

The moisture-proof and insulating coating material according to the invention comprises the solvent (C). The choice of solvent (C) depends on the condition of drying the moisture-proof and insulating coating material at room temperature. Preferably, the solvent (C) is a ketone solvent such as acetone and methyl ethyl ketone; an aromatic solvent such as toluene and xylene; an aliphatic solvent such as cyclohexane, methylcyclohexane and ethylcyclohexane; an ester solvent such as ethyl acetate, butyl acetate, and isopropyl acetate; an alcohol solvent such as ethanol and butanol; a petroleum solvent such as paraffin oil, naphthene oil, mineral turpentine, naphtha, and other petroleum based solvents. In another aspect, the melting point of the solvent (C) is preferably 70° C. to 140° C. When the melting point of the solvent (C) is preferably 70° C. to 140° C., the moisture-proof and insulating coating material according to the invention resists peeling and prevents the problems associated with the solvent not being fully dry when applied to the electronic parts such as glass, semiconductors or printed circuit boards.

According to the invention, the amount of the solvent (C) used is preferably 50 to 5000 parts by weight; more preferably 75 to 475 parts by weight; still more preferably 100 to 450 parts by weight based on the amount of 100 parts by weight of the block copolymer or hydrogenated copolymer thereof (A) used. When the amount of the adhesive resin (B) used is 50 to 5000 parts by weight, the moisture-proof and insulating coating material according to the invention has a better coating functionality when applied to electronic parts such as glass, semiconductors or printed circuit boards.

The moisture-proof and insulating coating material according to the invention preferably further comprises a silane coupling agent (D). Artisans skilled in this field can choose a proper silane coupling agent such as a methacryloxy system, an acryloxy system, a mercapto system, an amine system, an isocyanuric system and the mixture thereof. Examples are 3-methacryloxy propyl methyl dimethoxysilane, 3-methacryloxy propyl trimethoxysilane, 3-methacryloxy propyl methyl diethoxysilane, 3-methacryloxy propyl diethoxysilane, 3-methacryloxypropyl triethoxysilane, 3-acryloxyprophyltrimethoxysilane, N-2(aminoethyl)3-aminopropyl methyl dimethoxysilane, N-2(aminoethyl)3-aminopropyl trimethoxysilane, N-2(aminoethyl)3-aminopropyl triethoxysilane, 3-aminopropyl trimethoxysilane, 3-aminopropyl triethoxysilane, 3-mercapto propylmethyl dimethoxysilane, 3-mercapto propyltrimethoxysilane, N-phenyl-3-aminopropyl trimethoxysilane, 3-triethoxy silyl N-(1,3-dimethyl-butylidene) propylamine, and N-(vinylbenzyl)-2-aminoethyl 3-aminopropyl trimethoxysilane. There are also many available commercial products, such as KBM-502, KBE-502, KBM-602, KBM-5103, KBM-1403, KBM-503, KBE-503, KBM-802, KBM-803, KBM-603, KBE-9007, X12-965 (all produced by Shin-Etsu Chemical), A-174, A-189, and A-1122 (produced by Nippon Unicar Co., LTD).

According to the invention, the amount of the silane coupling agent (D) used is preferably 0.1 to 5 parts by weight; more preferably 0.3 to 3 parts by weight based on the amount of 100 parts by weight of the block copolymer or hydrogenated copolymer thereof (A) used. When the amount of the silane coupling agent (D) used is 0.1 to 5 parts by weight, the moisture-proof and insulating coating material according to the invention has a better coating and moisture-proof function when applied to electronic parts such as glass, semiconductors or printed circuit boards.

The moisture-proof and insulating coating material according to the invention preferably further comprises an additive (E), such as a filler, a modifier, a defoaming agent, a colorant, or an adhesive agent. Examples of the filler are silicon oxide, magnesium oxide, aluminum hydroxide, aluminum oxide, aluminium nitride, boron nitride, and calcium carbonate, and preferably the filler is powder. Examples of the modifier are manganese naphthenate and the like and metal salts such as manganese octenate. Examples of the defoaming agent are silicone oil, fluorine oil, and polycarboxylic acid polymers. Examples of the colorant are inorganic pigments, organic pigments, organic dyes and the like.

In one preferred embodiment of the invention, a method for producing the moisture-proof and insulating coating material according to the invention comprises dispersing the aforementioned block copolymer or hydrogenated copolymer thereof (A), adhesive resin (B), silane coupling agent (D), and additives (E) in the solvent (C), and stirring for 3 to 24 hours in a mixer to dissolve the solids to form the moisture-proof and insulating coating material. In general, the viscosity of the moisture-proof and insulating coating material can be adjusted by artisans skilled in this field according to the coating, volatility and other properties. When the viscosity of the moisture-proof and insulating coating material is 0.1 to 30 Pa·S, the moisture-proof and insulating coating material has a better coating property; preferably, the viscosity is 0.1 to 20 Pa·S; more preferably, 0.1 to 10 Pa·S.

The present invention also provides a method for producing the moisture-proof and insulating coating material, comprising coating an electronic part with the moisture-proof and insulating coating material mentioned above.

The present invention also provides a moisture-proof and insulating film, which is produced according to the method mentioned above.

The present invention further provides an electronic part, comprising the moisture-proof and insulating film mentioned above.

The present invention still further provides a method for producing an electronic part, comprising providing a moisture-proof and insulating film according to the method mentioned above.

According to the invention, the electronic part suitable for the moisture-proof and insulating treatment with the moisture-proof and insulating coating material includes but is not limited to a circuit board equipped with microprocessors, transistors, capacitors, resistors, relays, or transformers, wherein the circuit board has patterns of lead wires or wire harness in need of the moisture-proof and insulating treatment.

According to the present invention, the moisture-proof and insulating treatment of the electronic part can be a known coating procedure, such as dipping, brush coating, spray coating, and dispenser coating. In one preferred embodiment of the invention, the electronic part is further dried at 20 to 80° C. after coating to obtain the electronic part according to the invention.

The following examples are given for the purpose of illustration only and are not intended to limit the scope of the present invention.

EXAMPLE

Block Copolymer or Hydrogenated Copolymer Thereof (A)

The block copolymer or hydrogenated copolymer thereof (A) is prepared in the solvent of cyclohexane and with the catalyst of n-butyl lithium to obtain the block copolymer or hydrogenated copolymer thereof (A) having the block copolymer structure, styrene content (weight %), number average molecular weight and the content of the residual vinyl aromatic monomer and the content of the vinyl aromatic oligomer as shown in Table 1. The specific method is described below.

Synthesis Example A-1

The reactors as shown below are combined in order: a 1-L continuous stirred-tank reactor R1 coupled to a agitator means, a 2-L plug flow reactor R2 coupled to a agitator means, and a 1-L continuous stirred-tank reactor R3 coupled to a agitator means. The temperature of the three reactors is 80° C. The mixture solution of the styrene monomer and the solvent cyclohexane with weight ratio of 30/70 is fed with a feed rate of 0.25 kg/hr into the reactor R1.

Then, a cyclohexane solution containing the n-butyl lithium initiator is added in the same reactor for the reaction. The amount of the butyl lithium initiator used is 14.0 mole based on use of 1 kg of the final monomers.

The obtained polymer solution is fed into the reactor R2, and the mixture solution of the 1,3-butadiene monomer and the solvent cyclohexane with weight ratio of 30/70 is fed with a feed rate of 0.75 kg/hr to obtain the block copolymer of styrene-1,3-butadiene (S-B Block Copolymer).

The obtained polymer solution is fed into the reactor R3, and the new mixture solution of the styrene monomer and the solvent cyclohexane with weight ratio of 30/70 is fed with a feed rate of 0.25 kg/hr to obtain the block copolymer of styrene-1,3-butadiene-styrene (S-B-S Block Copolymer).

Methanol of a quantity 10 times the molar amount of the initiator is added to the obtained polymer solution. The solution is further volatilized by the method (a) (heat treatment of 150° C. in a convection oven for removing the solvent) and then the method (b) (heat treatment of 220° C. in a flash vacuum tank for removing the solvent).

Synthesis Example A-2

The reactors as shown below are combined in order: a 1-L continuous stirred-tank reactor R1 coupled to a agitator means, a 2-L plug flow reactor R2 coupled to a agitator means, and a 1-L continuous stirred-tank reactor R3 coupled to a agitator means. The temperature of the three reactors is 80° C. The mixture solution of the styrene monomer and the solvent cyclohexane with weight ratio of 30/70 is fed with a feed rate of 0.30 kg/hr into the reactor R1.

Then, a cyclohexane solution containing the n-butyl lithium initiator is added in the same reactor for the reaction. The amount of the butyl lithium initiator used is 14.0 mmole based on the use of 1 kg of the final monomers.

The obtained polymer solution is fed into the reactor R2, and the mixture solution of the 1,3-butadiene monomer and the solvent cyclohexane with weight ratio of 30/70 is fed with a feed rate of 0.60 kg/hr. The obtained polymer solution is fed into the reactor R3, and the new mixture solution of the styrene monomer and the solvent cyclohexane with weight ratio of 30/70 is fed with a feed rate of 0.30 kg/hr.

Methanol of a quantity 10 times the molar amount of the initiator is added to the obtained polymer solution. The solution is further volatilized by the method (a) (heat treatment of 150° C. in a convection oven for removing the solvent) and then the method (c) (heat treatment of 250° C. in an extruder with an additional vacuum relief vent for removing the solvent).

Synthesis Example A-3

The reactors as shown below are combined in order: a 1-L continuous stirred-tank reactor R1 coupled to a agitator means, a 2-L plug flow reactor R2 coupled to a agitator means, and a 1-L continuous stirred-tank reactor R3 coupled to a agitator means. The temperature of the three reactors is 80° C. The mixture solution of the styrene monomer and the solvent cyclohexane with weight ratio of 30/70 is fed with a feed rate of 0.36 kg/hr into the reactor R1.

Then, a cyclohexane solution containing the n-butyl lithium initiator is added in the same reactor for the reaction. The amount of the butyl lithium initiator used is 14.0 mmole based on the use of 1 kg of the final monomers.

The obtained polymer solution is fed into the reactor R2, and the mixture solution of the 1,3-butadiene monomer and the solvent cyclohexane with weight ratio of 30/70 is fed with a feed rate of 0.48 kg/hr. The obtained polymer solution is fed into the reactor R3, and the new mixture solution of the styrene monomer and the solvent cyclohexane with weight ratio of 30/70 is fed with a feed rate of 0.36 kg/hr.

Methanol of a quantity 10 times the molar amount of the initiator is added to the obtained polymer solution. The solution is further volatilized by the method (a) (heat treatment of 150° C. in a convection oven for removing the solvent) and then the method (b) (heat treatment of 220° C. in a flash vacuum tank for removing the solvent) and further the method (c) (heat treatment of 250° C. in an extruder with an additional vacuum relief vent for removing the solvent).

Synthesis Example A-4

The reactors as shown below are combined in order: a 1-L continuous stirred-tank reactor R1 coupled to a agitator means, a 2-L plug flow reactor R2 coupled to a agitator means, and a 1-L continuous stirred-tank reactor R3 coupled to a agitator means. The temperature of the three reactors is 80° C. The mixture solution of the styrene monomer and the solvent cyclohexane with weight ratio of 30/70 is fed with a feed rate of 0.42 kg/hr into the reactor R1.

Then, a cyclohexane solution containing the n-butyl lithium initiator is added in the same reactor for the reaction. The amount of the butyl lithium initiator used is 14.0 mmole based on the use of 1 kg of the final monomers.

The obtained polymer solution is fed into the reactor R2, and the mixture solution of the 1,3-butadiene monomer and the solvent cyclohexane with weight ratio of 30/70 is fed with a feed rate of 0.36 kg/hr. The obtained polymer solution is fed into the reactor R3, and the new mixture solution of the styrene monomer and the solvent cyclohexane with weight ratio of 30/70 is fed with a feed rate of 0.42 kg/hr.

Methanol of a quantity 10 times the molar amount of the initiator is added to the obtained polymer solution. The solution is further volatilized by the method (a) (heat treatment of 150° C. in a convection oven for removing the solvent).

Synthesis Example A-5

The reactors as shown below are combined in order: a 1-L continuous stirred-tank reactor R1 coupled to a agitator means, a 2-L plug flow reactor R2 coupled to a agitator means, a 1-L continuous stirred-tank reactor R3 coupled to a agitator means, and a 2-L plug flow reactor R4 coupled to a agitator means. The temperature of the four reactors is 80° C. The mixture solution of the styrene monomer and the solvent cyclohexane with weight ratio of 30/70 is fed with a feed rate of 0.25 kg/hr into the reactor R1.

Then, a cyclohexane solution containing the n-butyl lithium initiator is added in the same reactor for the reaction. The amount of the butyl lithium initiator used is 14.0 mmole based on the use of 1 kg of the final monomers.

The obtained polymer solution is fed into the reactor R2, and the mixture solution of the 1,3-butadiene monomer and the solvent cyclohexane with weight ratio of 30/70 is fed with a feed rate of 0.75 kg/hr. The obtained polymer solution is fed into the reactor R3, and the new mixture solution of the styrene monomer and the solvent cyclohexane with weight ratio of 30/70 is fed with a feed rate of 0.25 kg/hr.

The obtained polymer solution is fed into the reactor R4 for the polymerization to the end. Methanol of a quantity 10 times the molar amount of the initiator is added to the obtained polymer solution. The solution is further volatilized by the method (a) (heat treatment of 150° C. in a convection oven for removing the solvent) and then the method (b) (heat treatment of 220° C. in a flash vacuum tank for removing the solvent).

Synthesis Example A-6

The reactors as shown below are combined in order: a 1-L continuous stirred-tank reactor R1 coupled to a agitator means, a 2-L plug flow reactor R2 coupled to a agitator means, a 1-L continuous stirred-tank reactor R3 coupled to a agitator means, and a 2-L plug flow reactor R4 coupled to a agitator means. The temperature of the four reactors is 80° C. The mixture solution of the styrene monomer and the solvent cyclohexane with weight ratio of 30/70 is fed with a feed rate of 0.30 kg/hr into the reactor R1.

Then, a cyclohexane solution containing the n-butyl lithium initiator is added in the same reactor for the reaction. The amount of the butyl lithium initiator used is 14.0 mmole based on the use of 1 kg of the final monomers.

The obtained polymer solution is fed into the reactor R2, and the mixture solution of the 1,3-butadiene monomer and the solvent cyclohexane with weight ratio of 30/70 is fed with a feed rate of 0.60 kg/hr. The obtained polymer solution is fed into the reactor R3, and the new mixture solution of the styrene monomer and the solvent cyclohexane with weight ratio of 30/70 is fed with a feed rate of 0.30 kg/hr.

The obtained polymer solution is fed into the reactor R4 for the polymerization to the end. Methanol of a quantity 10 times the molar amount of the initiator is added to the obtained polymer solution. The solution is further volatilized by the method (a) (heat treatment of 150° C. in a convection oven for removing the solvent) and then the method (c) (heat treatment of 250° C. in an extruder with an additional vacuum relief vent for removing the solvent).

Synthesis Example A-7

The reactors as shown below are combined in order: a 1-L continuous stirred-tank reactor R1 coupled to a agitator means, a 2-L plug flow reactor R2 coupled to a agitator means, a 1-L continuous stirred-tank reactor R3 coupled to a agitator means, and a 2-L plug flow reactor R4 coupled to a agitator means. The temperature of the four reactors is 80° C. The mixture solution of the styrene monomer and the solvent cyclohexane with weight ratio of 30/70 is fed with a feed rate of 0.36 kg/hr into the reactor R1.

Then, a cyclohexane solution containing the n-butyl lithium initiator is added in the same reactor for the reaction. The amount of the butyl lithium initiator used is 14.0 mmole based on the use of 1 kg of the final monomers.

The obtained polymer solution is fed into the reactor R2, and the mixture solution of the 1,3-butadiene monomer and the solvent cyclohexane with weight ratio of 30/70 is fed with a feed rate of 0.48 kg/hr. The obtained polymer solution is fed into the reactor R3, and the new mixture solution of the styrene monomer and the solvent cyclohexane with weight ratio of 30/70 is fed with a feed rate of 0.36 kg/hr.

The obtained polymer solution is fed into the reactor R4 for the polymerization to the end. Methanol of a quantity 10 times the molar amount of the initiator is added to the obtained polymer solution. The solution is further volatilized by the method (a) (heat treatment of 150° C. in a convection oven for removing the solvent) and then the method (b) (heat treatment of 220° C. in a flash vacuum tank for removing the solvent) and then the method (c) (heat treatment of 250° C. in an extruder with an additional vacuum relief vent for removing the solvent).

Synthesis Example A-8

The reactors as shown below are combined in order: a 1-L continuous stirred-tank reactor R1 coupled to a agitator means, a 2-L plug flow reactor R2 coupled to a agitator means, a 1-L continuous stirred-tank reactor R3 coupled to a agitator means, and a 2-L plug flow reactor R4 coupled to a agitator means. The temperature of the four reactors is 80° C. The mixture solution of the styrene monomer and the solvent cyclohexane with weight ratio of 30/70 is fed with a feed rate of 0.42 kg/hr into the reactor R1.

Then, a cyclohexane solution containing the n-butyl lithium initiator is added in the same reactor for the reaction. The amount of the butyl lithium initiator used is 14.0 mmole based on the use of 1 kg of the final monomers.

The obtained polymer solution is fed into the reactor R2, and the mixture solution of the 1,3-butadiene monomer and the solvent cyclohexane with weight ratio of 30/70 is fed with a feed rate of 0.36 kg/hr. The obtained polymer solution is fed into the reactor R3, and the new mixture solution of the styrene monomer and the solvent cyclohexane with weight ratio of 30/70 is fed with a feed rate of 0.42 kg/hr.

The obtained polymer solution is fed into the reactor R4 for the polymerization to the end. Methanol of a quantity 10 times the molar amount of the initiator is added to the obtained polymer solution. The solution is further volatilized by the method (a) (heat treatment of 150° C. in a convection oven for removing the solvent).

Synthesis Example A-9

The reactors as shown below are combined in order: a 1-L continuous stirred-tank reactor R1 coupled to a agitator means, and a 2-L plug flow reactor R2 coupled to a agitator means. The temperature of the two reactors is 80° C. The mixture solution of the styrene monomer and the solvent cyclohexane with weight ratio of 30/70 is fed with a feed rate of 0.90 kg/hr into the reactor R1.

Then, a cyclohexane solution containing the n-butyl lithium initiator is added in the same reactor for the reaction. The amount of the butyl lithium initiator used is 14.0 mmole based on the use of 1 kg of the final monomers.

The obtained polymer solution is fed into the reactor R2, and the mixture solution of the 1,3-butadiene monomer and the solvent cyclohexane with weight ratio of 30/70 is fed with a feed rate of 0.60 kg/hr. Methanol of a quantity 10 times the molar amount of the initiator is added to the obtained polymer solution. The solution is further volatilized by the method (a) (heat treatment of 150° C. in a convection oven for removing the solvent) and then the method (b) (heat treatment of 220° C. in a flash vacuum tank for removing the solvent) and then the method (c) (heat treatment of 250° C. in an extruder with an additional vacuum relief vent for removing the solvent).

Synthesis Example A-10

The block copolymer or hydrogenated copolymer thereof A-10 is synthesized in a single continuous stirred-tank reactor coupled to a agitator means. In the presence of nitrogen gas, the cyclohexane solution containing 20 parts by weight of the styrene is added and then 0.13 part by weight of n-butyl lithium is added for the polymerization at 70° C. for 25 minutes. Then, the cyclohexane solution containing 60 parts by weight of the 1,3-butadiene is continuously added for 50 minutes and the polymerization is carried out at 70° C. for 5 minutes. Further, the cyclohexane solution containing 20 parts by weight of the styrene is added and the polymerization is carried out at 70° C. for 25 minutes. The obtained polymer solution is further volatilized by the method (a) (heat treatment of 150° C. in a convection oven for removing the solvent) and then the method (b) (heat treatment of 220° C. in a flash vacuum tank for removing the solvent).

Synthesis Example A-11

The block copolymer or hydrogenated copolymer thereof A-11 is synthesized in a single continuous stirred-tank reactor coupled to a agitator means. In the presence of nitrogen gas, the cyclohexane solution containing 25 parts by weight of the styrene is added and then 0.13 parts by weight of n-butyl lithium is added for the polymerization at 70° C. for 25 minutes. Then, the cyclohexane solution containing 50 parts by weight of the 1,3-butadiene is continuously added for 50 minutes and the polymerization is carried out at 70° C. for 5 minutes. Furthermore, the cyclohexane solution containing 25 parts by weight of the styrene is added and the polymerization is carried out at 70° C. for 25 minutes. The obtained polymer solution is further volatilized by the method (a) (heat treatment of 150° C. in a convection oven for removing the solvent) and then the method (c) (heat treatment of 250° C. in an extruder with an additional vacuum relief vent for removing the solvent).

Synthesis Example A-12

The block copolymer or hydrogenated copolymer thereof A-12 is synthesized in a single continuous stirred-tank reactor coupled to a agitator means. In the presence of nitrogen gas, the cyclohexane solution containing 30 parts by weight of the styrene is added and then 0.13 part by weight of n-butyl lithium is added for the polymerization at 70° C. for 20 minutes. Then, the cyclohexane solution containing 40 parts by weight of the 1,3-butadiene is continuously added for 50 minutes and the polymerization is carried out at 70° C. for 5 minutes. Furthermore, the cyclohexane solution containing 30 parts by weight of the styrene is added and the polymerization is carried out at 70° C. for 20 minutes. The obtained polymer solution is further volatilized by the method (a) (heat treatment of 150° C. in a convection oven for removing the solvent) and then the method (b) (heat treatment of 220° C. in a flash vacuum tank for removing the solvent), and then the method (c) (heat treatment of 250° C. in an extruder with an additional vacuum relief vent for removing the solvent).

Synthesis Example A-13

The block copolymer or hydrogenated copolymer thereof A-13 is synthesized in a single continuous stirred-tank reactor coupled to a agitator means. In the presence of nitrogen gas, the cyclohexane solution containing 35 parts by weight of the styrene is added and then 0.13 part by weight of n-butyl lithium is added for the polymerization at 70° C. for 20 minutes. Then, the cyclohexane solution containing 30 parts by weight of the 1,3-butadiene is continuously added for 50 minutes and the polymerization is carried out at 70° C. for 5 minutes. Furthermore, the cyclohexane solution containing 35 parts by weight of the styrene is added and the polymerization is carried out at 70° C. for 20 minutes. The obtained polymer solution is further volatilized by the method (a) (heat treatment of 150° C. in a convection oven for removing the solvent).

The contents of the residual vinyl aromatic monomer and vinyl aromatic oligomer of the obtained block copolymers or hydrogenated copolymers thereof A-1 to A-13 are assayed with gas chromatography. The results are shown in Table 1.

Moisture-Proof and Insulating Coating Material

Example 1

100 parts by weight of the aforementioned block copolymer or hydrogenated copolymer thereof (A-1), 20 parts by weight of the adhesive resin (B-1) shown in Table 1 are added in 300 parts by weight of the solvent (C-1), and stirring is performed for 16 hours in a mixer to dissolve the solids to form the moisture-proof and insulating coating material. The moisture-proof and insulating coating material is assayed according to the methods described below, and the results are shown in Table 2.

Examples 2 to 8

The preparations are similar to that of Example 1 with modifications of the kinds and amounts of the block copolymer or hydrogenated copolymer thereof (A), adhesive resin (B), silane coupling agent (D), and additives (E) in the solvent (C). The compositions and the results of the assays are shown in Table 2.

Comparative Examples 1 to 8

The preparations are similar to that of Example 1 with modifications of the kinds and amounts of the block copolymer or hydrogenated copolymer thereof (A), adhesive resin (B), silane coupling agent (D), and additives (E) in the solvent (C). The compositions and the results of the assays are shown in Table 2.

Comparative Example 9

The preparation is similar to that of Example 1 with modifications of using methacrylate resin (CM-211, produced by Chimei Corporation) and the solvent (C). The compositions and the results of the assays are shown in Table 2.

Assays

Assay of the Contents of the Residual Monomer and Oligomer

The moisture-proof and insulating coating material is dissolved in chloroform and assayed with gas chromatography with the flame ionization detector (No. 6890, produced by Agilent Technologies; column: HP-5). The unit is ppm.

Reworkability

The moisture-proof and insulating coating material is coated on a 100 mm×100 mm glass substrate to obtain a film of 3 mm×100 mm with the dispenser (ES-300 SR, Ever Sharp Technology Co., Ltd.). The film is kept in place for 5 minutes for volatizing the solvent and then the film is quickly pulled up along the direction perpendicular to the substrate at a rate of 10 cm/s. The criteria of the assay are shown blow:

⊚: the film is pulled up completely without breakage and no residues remain on the substrate ○: the film is pulled up completely without breakage and small amounts of residues remain on the substrate Δ: the film is pulled up completely without breakage and large amounts of residues remain on the substrate ×: the film is pulled up completely with breakage and large amounts of residues remain on the substrate Adhesion The moisture-proof and insulating coating material is coated on a 750 mm×750 mm glass substrate and the film is dried at 80° C. for 2 hours. The assay is based on the cross-cut tape test JIS K5400. The film is cut by a knife to obtain a 100 mesh and then torn with tape. The number of torn meshes is counted and the criteria of the assay are shown blow:

○: 90/100<residues/tests<100/100

Δ: 80/100<residues/tests<90/100

×: 70/100<residues/tests<80/100

As shown in Table 2, the reworkability and adhesion of the Examples are both better than those of the Comparative Examples. The moisture-proof and insulating coating material according to the invention has good reworkablility.

TABLE 1

| | Content of styrene polymer (wt %) | Structure of block copolymer ( ) representing the weight ratio (wt %) | Feed rate (kg/hr) | | | | Volatilization method | Number average molecule weight (Mn) | Content of residual vinyl aromatic monomer (ppm) | Content of vinyl aromatic oligomer (ppm) |
|---|---|---|---|---|---|---|---|---|---|---|
| | | | R1 | R2 | R3 | R4 | | | | |
| A-1 | 40 | S-B-S (20-60-20) | 0.25 | 0.75 | 0.25 | — | (a) + (b) | 54546 | 275 | 992 |
| A-2 | 50 | S-B-S (25-50-25) | 0.30 | 0.60 | 0.30 | — | (a) + (c) | 66245 | 632 | 1190 |

TABLE 1-continued

| | Content of styrene polymer (wt %) | Structure of block copolymer ( ) representing the weight ratio (wt %) | Reaction time (min) Single Reactor S | B | S | Volatilization method | | Number average molecule weight (Mn) | Content of residual vinyl aromatic monomer (ppm) | Content of vinyl aromatic oligomer (ppm) |
|---|---|---|---|---|---|---|---|---|---|---|
| A-3 | 60 | S-B-S (30-40-30) | 0.36 | 0.48 | 0.36 | — | (a) + (b) + (c) | 74387 | 140 | 896 |
| A-4 | 70 | S-B-S (35-30-35) | 0.42 | 0.36 | 0.42 | — | (a) | 82387 | 1610 | 1337 |
| A-5 | 40 | S-B-S (20-60-20) | 0.25 | 0.75 | 0.25 | The reaction goes on without feeding. | (a) + (b) | 65136 | 180 | 918 |
| A-6 | 50 | S-B-S (25-50-25) | 0.30 | 0.60 | 0.30 | The reaction goes on without feeding. | (a) + (c) | 73347 | 495 | 1167 |
| A-7 | 60 | S-B-S (30-40-30) | 0.36 | 0.48 | 0.36 | The reaction goes on without feeding. | (a) + (b) + (c) | 89325 | 68 | 825 |
| A-8 | 70 | S-B-S (35-30-35) | 0.42 | 0.36 | 0.42 | The reaction goes on without feeding. | (a) | 98542 | 1458 | 1329 |
| A-9 | 60 | S-B (60-40) | 0.90 | 0.60 | — | — | (a) + (b) + (c) | 73513 | 209 | 1343 |
| A-10 | 40 | S-B-S (20-60-20) | 25 | 55 | 25 | | (a) + (b) | 50054 | 1650 | 1781 |
| A-11 | 50 | S-B-S (25-50-25) | 25 | 55 | 25 | | (a) + (c) | 53783 | 1983 | 1943 |
| A-12 | 60 | S-B-S (30-40-30) | 20 | 55 | 20 | | (a) + (b) + (c) | 63427 | 1395 | 1515 |
| A-13 | 70 | S-B-S (35-30-35) | 20 | 55 | 20 | | (a) | 68201 | 2370 | 2003 |

TABLE 2

| Content | | Example 1 | 2 | 3 | 4 | 5 | 6 | 7 | 8 |
|---|---|---|---|---|---|---|---|---|---|
| Block copolymer (A) (parts by weight) | A-1 | 100 | | | | | | | 50 |
| | A-2 | | 100 | | | | | | |
| | A-3 | | | 100 | | | | | |
| | A-4 | | | | | | | | 50 |
| | A-5 | | | | 100 | | | | |
| | A-6 | | | | | 100 | | | |
| | A-7 | | | | | | 100 | | |
| | A-8 | | | | | | | | |
| | A-9 | | | | | | | | |
| | A-10 | | | | | | | | |
| | A-11 | | | | | | | | |
| | A-12 | | | | | | | 100 | |
| | A-13 | | | | | | | | |
| Adhesive resin (B) (parts by weight) | B-1 | 20 | | | 50 | 10 | | 50 | 30 |
| | B-2 | | 30 | | | | 30 | | |
| | B-3 | | | 40 | | | | | 30 |
| Solvent (C) (parts by weight) | C-1 | 300 | | | 400 | 300 | | 400 | 200 |
| | C-2 | | 330 | | | | 330 | | |
| | C-3 | | | 360 | | | | | 150 |
| | C-4 | | | | | | | | |

TABLE 2-continued

| Content | | | | | | | | | |
|---|---|---|---|---|---|---|---|---|---|
| Silane coupling agent (D) parts by weight) | D-1 | | | | | 5 | | 1 | 0.5 |
| | D-2 | | | | | | 3 | 1 | 0.5 |
| Additive (E) (parts by weight) | E-1 | | 1 | | | | 1 | | 1 |
| | E-2 | | | 1.5 | | | | | |
| | E-3 | | | | 1 | | 1 | | |
| | E-4 | | | | | | | | 3 |
| methacrylate resin | CM-211 | | | | | | | | |
| Content of the residual vinyl aromatic monomer (ppm) | | 65 | 65 | 136 | 28 | 33 | 116 | 15 | 253 |
| Content of the vinyl aromatic oligomer (ppm) | | 233 | 233 | 257 | 178 | 166 | 275 | 178 | 275 |
| Results of assay | Reworkability | ◎ | ◎ | ◎ | ◎ | ◎ | ◎ | ○ | ◎ |
| | Adhesion | ○ | ○ | ○ | ○ | Δ | ○ | ○ | ○ |

| | | Comparative Example | | | | | | | | |
|---|---|---|---|---|---|---|---|---|---|---|
| Content | | 1 | 2 | 3 | 4 | 5 | 6 | 7 | 8 | 9 |
| Block copolymer (A) (parts by weight) | A-1 | | | | | | 20 | | 100 | |
| | A-2 | | | | | | | | | |
| | A-3 | | | | | | | | | |
| | A-4 | | | | | 100 | | | | |
| | A-5 | | | | | | | | | |
| | A-6 | | | | | | | | | |
| | A-7 | | | | | | | | | |
| | A-8 | | | | | | | 100 | | |
| | A-9 | 100 | | | | | | | | |
| | A-10 | | | | 100 | | | | | |
| | A-11 | | | 100 | | | | | | |
| | A-12 | | | | | | | | | |
| | A-13 | | 100 | | | | 80 | | | |
| Adhesive resin (B) (parts by weight) | B-1 | 20 | | | 30 | | 60 | 20 | | |
| | B-2 | | 35 | | 30 | 10 | | | | |
| | B-3 | | | 50 | | | | | | |
| Solvent (C) (parts by weight) | C-1 | 300 | | | 280 | 175 | 200 | 200 | 300 | |
| | C-2 | | 330 | | | 175 | | | | |
| | C-3 | | | 360 | | | 150 | | | |
| | C-4 | | | | | | | | | 200 |
| Silane coupling agent (D) (parts by weight) | D-1 | | | 3 | | 5 | | 2 | 3 | |
| | D-2 | | | | 5 | | 4 | 2 | | |
| Additive (E) (parts by weight) | E-1 | | 1 | | | 1 | 0.5 | | | |
| | E-2 | | | 1.5 | | 1 | | | | |
| | E-3 | 3.5 | | | | | | | 3.5 | |
| | E-4 | | | | | | 1 | | | |
| methacrylate resin | CM-211 | | | | | | | | | 100 |
| Content of the vinyl aromatic monomer (ppm) | | 65 | 33 | 506 | 389 | 375 | 345 | 379 | 450 | 75 |
| Content of the residual vinyl aromatic oligomer (ppm) | | 233 | 211 | 428 | 381 | 405 | 286 | 350 | 411 | 243 |
| Results of assay | Reworkability | X | X | X | X | X | X | X | ○ | X |
| | Adhesion | ○ | ○ | ○ | ○ | Δ | ○ | ○ | X | X |

CM-211: methacrylate resin (produced by Chimei Corporation)
B-1: KE311 (produced by Arakawa Chemical Industries, Ltd.)
B-2: YST0125 (produced by Yasuhara Chemical)
B-3: TR105 (produced by Yasuhara Chemical)
C-1: cyclohexane
C-2: methyl cyclohexane
C-3: ethyl cyclohexane
C-4: butyl acetate
D-1: KBM602 (produced by Shin-Etsu Chemical)
D-2: KBM503 (produced by Shin-Etsu Chemical)
E-1: $SiO_2$
E-2: manganese octenate
E-3: silicon oil (produced by Shin-Etsu Chemical, KF-96-3000CS)
E-4: Pigment B15:6/V23(8/2)

While embodiments of the present invention have been illustrated and described, various modifications and improvements can be made by persons skilled in the art. It is intended that the present invention is not limited to the particular forms as illustrated, and that all modifications not departing from the spirit and scope of the present invention are within the scope as defined in the following claims.

What is claimed is:

1. A moisture-proof and insulating coating material comprising:
    a block copolymer or hydrogenated copolymer thereof (A) comprising at least two vinyl aromatic polymer blocks and at least one conjugated diene polymer block;
    an adhesive resin (B) and
    a solvent (C);
    wherein in the moisture-proof and insulating coating material, the content of residual vinyl aromatic monomer is less than 300 ppm, and the content of vinyl aromatic oligomer is less than 300 ppm;
    wherein the vinyl aromatic oligomer comprises a dimer of the vinyl aromatic monomer and a trimer of the vinyl aromatic monomer.

2. The moisture-proof and insulating coating material according to claim 1, wherein the content of residual vinyl aromatic monomer is from 10 ppm to 275 ppm.

3. The moisture-proof and insulating coating material according to claim 1, wherein the content of residual vinyl aromatic monomer is from 10 ppm to 250 ppm.

4. The moisture-proof and insulating coating material according to claim 1, wherein the content of vinyl aromatic oligomer is from 100 ppm to 275 ppm.

5. The moisture-proof and insulating coating material according to claim 1, wherein the amount of the adhesive resin (B) used is 20 to 60 parts by weight and the amount of the solvent (C) used is 50 to 500 parts by weight based on 100 parts by weight of the block copolymer or hydrogenated copolymer thereof (A) used.

6. The moisture-proof and insulating coating material according to claim 1, wherein the number average molecular weight of the block copolymer or hydrogenated copolymer thereof (A) is from 50,000 to 100,000

7. The moisture-proof and insulating coating material according to claim 1, wherein the adhesive resin (B) comprises petroleum resin, rosin resin or terpene resin.

8. The moisture-proof and insulating coating material according to claim 1, which further comprises a silane coupling agent (D).

9. A method for producing a moisture-proof and insulating coating film, comprising coating an electronic part with the moisture-proof and insulating coating material according to claim 1.

10. A moisture-proof and insulating film, which is produced according to the method of claim 9.

11. An electronic part, comprising the moisture-proof and insulating film according to claim 10.

12. A method for producing an electronic part, comprising providing a moisture-proof and insulating film according to the method of claim 9.

* * * * *